G. W. TARLETON.
KNIVES FOR PITTING-FRUIT.
No. 184,271. Patented Nov. 14, 1876.
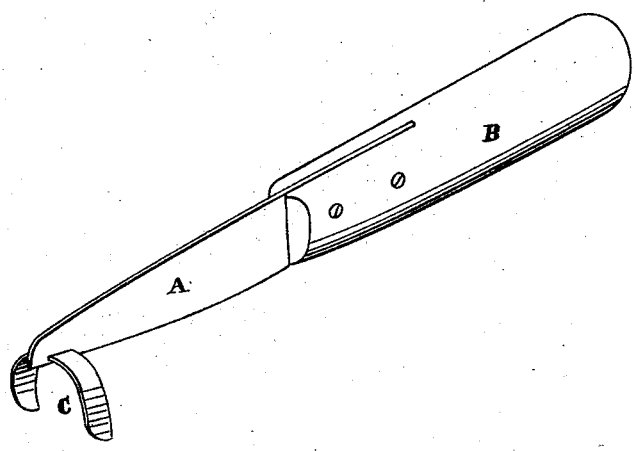
Witnesses
Geo. H. Strong
Jno. L. Boone
Inventor
George W. Tarleton
Dewey & Co
Attys.

UNITED STATES PATENT OFFICE.

GEORGE W. TARLETON, OF SAN JOSÉ, CALIFORNIA.

IMPROVEMENT IN KNIVES FOR PITTING FRUIT.

Specification forming part of Letters Patent No. 184,271, dated November 14, 1876; application filed September 28, 1876.

*To all whom it may concern:*

Be it known that I, GEORGE W. TARLETON, of San José, county of Santa Clara and State of California, have invented a Pitting Attachment for Fruit-Knives; and I do hereby declare the following to be a full, clear, and exact description thereof, reference being had to the accompanying drawings.

My invention relates to a novel attachment to knife-blades, the object of which is to cut out and remove the pits of such stoned fruit as peaches, plums, and the like, at the same time that the knife-blade cuts the fruit in halves.

Referring to the accompanying drawings, in which Figure 1 is a perspective view of my invention, A represents the knife-blade, and B the handle. C is my pitting attachment for the knife-blade; and it consists of a semicircular steel or other metal blade, the convex side of which is secured at its middle to the cutting-edge of the knife-blade, so that it forms two narrow curved blades, one of which extends upon each side and projects in front of the cutting-edge of the blade A. The curved blade C can be placed at any desired point in the length of the knife-blade A; but I prefer to attach it at a distance of from one and a half to two inches from the handle, so as to give space enough between it and the handle for the blade A to cut into the fruit. The edge of the curved blade C nearest the handle I sharpen so that it will cut the fruit easily, the blade C made of the proper size, and curved to fit over and partially around the pit of the fruit, and the pitting is accomplished as follows: The knife is taken in one hand and the fruit to be pitted in the other. I then cut through the fruit with the blade A in the crease which surrounds all stoned fruit, commencing near the depression at either end, and after the blade A has been inserted until it strikes the stone, it is drawn toward the operator until the curved blade C enters and partially surrounds the stone or pit. The fruit is then rotated, allowing the blade A to follow the crease above mentioned until the fruit has been cut to the pit entirely around its circumference. During this operation the transversely-curved blade C follows inside of the fruit, cutting around the pit as the blade A cuts the meat, so that when the fruit is cut in halves the pit is entirely free. This pitting-blade C could be attached to a circular knife, and the circular knife rotated around the fruit by proper mechanism, and thus a machine can be made that will automatically halve and pit fruit; but for ordinary work the knife itself, operated by hand, is sufficient.

Fruit can be halved and pitted with this knife with great speed by a person accustomed to its use, and it leaves the fruit neatly pitted—that is, the stone is removed by a clean cut, so that there is no mutilation or disfigurement of the halves.

Having thus described my invention, what I claim, and desire to secure by Letters Patent, is—

The curved pitting-blade C attached to the cutting-edge of a knife-blade, A, transversely to said cutting-edge, substantially as and for the purpose described.

In witness whereof I have hereunto set my hand and seal.

GEORGE W. TARLETON. [L. S.]

Witnesses:
  L. F. CHIPMAN,
  H. E. HILLS.